United States Patent
Jasti et al.

(10) Patent No.: US 12,135,688 B1
(45) Date of Patent: Nov. 5, 2024

(54) ON-DEMAND CODE EXECUTION WITH LAYERED DATA MANAGEMENT

(71) Applicant: Amazon Technologies, Inc., Seattle, WA (US)

(72) Inventors: Srinivas Jasti, Sammamish, WA (US); Prashant Kumar Singh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/062,972

(22) Filed: Dec. 7, 2022

(51) Int. Cl.
*G06F 16/14* (2019.01)
*G06F 16/172* (2019.01)
*G06F 16/18* (2019.01)

(52) U.S. Cl.
CPC .......... *G06F 16/148* (2019.01); *G06F 16/172* (2019.01); *G06F 16/1873* (2019.01)

(58) Field of Classification Search
CPC .. G06F 16/148; G06F 16/1873; G06F 16/172; G06F 9/45558; G06F 8/36; G06F 2009/45583; G06F 21/6227; G06F 2009/45579; G06F 16/252; G06F 16/24552; G06F 16/24573; G06F 9/5027; G06F 2212/465; G06F 2212/45; G06F 2209/549; G06F 12/0875; G06F 12/0866; G06F 12/0811; H04L 67/568; H04L 67/60; H04L 41/5009; H04L 61/2514; H04L 67/1029; H04L 67/1008; H04L 67/34; H04L 41/0894; H04L 41/0893; H04L 41/0895
USPC ...... 707/769, 796; 709/217; 718/1, 104, 105
See application file for complete search history.

(56) References Cited

U.S. PATENT DOCUMENTS

| | | | |
|---|---|---|---|
| 9,830,449 B1 * | 11/2017 | Wagner | G06F 9/45508 |
| 10,782,934 B1 * | 9/2020 | Chawda | G06F 8/30 |
| 10,908,927 B1 * | 2/2021 | Harris | G06F 9/44573 |
| 11,044,118 B1 * | 6/2021 | Reed | H04L 12/66 |
| 2019/0163391 A1 * | 5/2019 | Annamalai | G06F 3/0611 |
| 2020/0192707 A1 * | 6/2020 | Brooker | G06F 9/5044 |
| 2020/0311054 A1 * | 10/2020 | Hicks | G06F 3/067 |
| 2021/0097067 A1 * | 4/2021 | Virtuoso | G06F 16/2455 |

* cited by examiner

*Primary Examiner* — Evan Aspinwall
(74) *Attorney, Agent, or Firm* — Knobbe, Martens, Olson & Bear, LLP

(57) ABSTRACT

Systems and methods are provided for managing provision of network-stored data sets among instances of function code executing in an on-demand manner. Provision of the data sets may be managed such that the data sets are available efficiently and are able to be accessed within function invocations in a manner that is similar or identical to accessing locally-stored data sets. Moreover, the data sets may, when desired, be made available persistently across function invocations.

20 Claims, 5 Drawing Sheets

ON-DEMAND CODE EXECUTION WITH LAYERED DATA MANAGEMENT

BACKGROUND

Computing systems can utilize communication networks to exchange data. In some implementations, a computing system can receive and process data provided by another computing system. For example, a computing system receive data entered using another computing system, store the data, process the data, and so on.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

DETAILED DESCRIPTION

Figure 1:
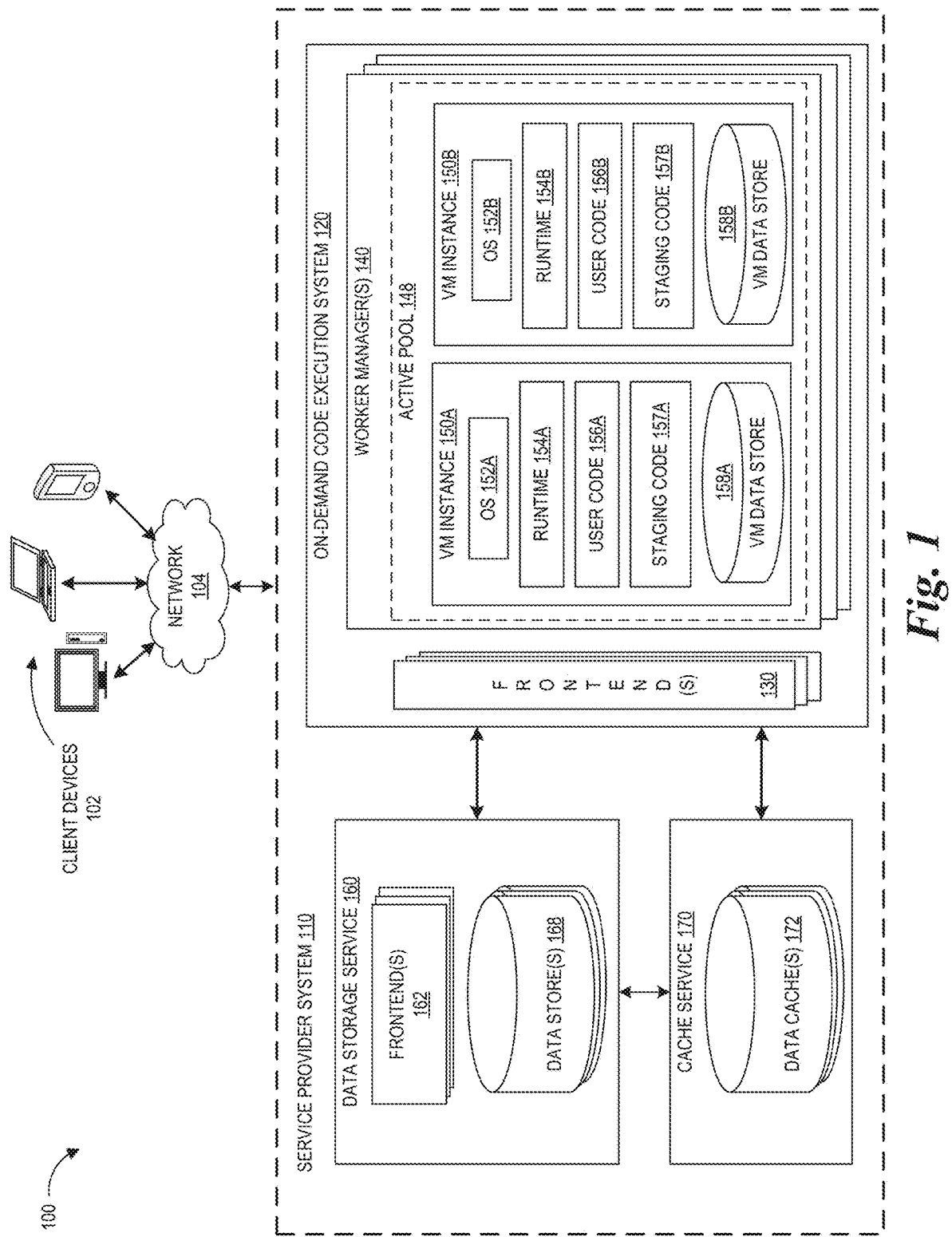
FIG. 1 is a block diagram of an illustrative computing environment in which environment in which an on-demand code execution system can operate in conjunction with a data storage system according to some embodiments.

The present disclosure relates to managing provision of network-stored data sets among instances of function code executing in an on-demand manner. Provision of the data sets may be managed such that the data sets are available efficiently and are able to be accessed by invoked functions in a manner that is similar or identical to accessing locally-stored data sets. Moreover, the data sets may, when desired, be made available persistently across function invocations.

Some data centers may include a number of interconnected computing systems to provide computing resources to users of the data center. To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In addition to computational resources, data centers provide a number of other beneficial services to client devices. For example, data centers may provide data storage services configured to store data submitted by client devices, and enable retrieval of that data over a network. A variety of types of data storage services can be provided, often varying according to their input/output (I/O) mechanisms. For example, database services may allow I/O based on a database query language, such as the Structured Query Language (SQL). Block storage services may allow I/O based on modification to one or more defined-length blocks, in a manner similar to how an operating system interacts with local storage, and may thus facilitate virtualized disk drives usable, for example, to store an operating system of a virtual machine (e.g., through block storage volumes). Object storage services may allow I/O at the level of individual objects or resources, such as individual files, which may vary in content and length.

Some data centers include an on-demand code execution system, sometimes referred to as a serverless function execution system. Generally described, on-demand code execution systems enable execution of arbitrary user-designated function code, without requiring the user to create, maintain, or configure an execution environment (e.g., a physical or virtual machine) in which the function code is executed. For example, whereas conventional computing services often require a user to provision a specific device (virtual or physical), install an operating system on the device, configure application settings, define network interfaces, and so on, an on-demand code execution system may enable a user to submit code and may provide to the user an application programming interface (API) that, when used, enables the user to request execution of the function code. Upon receiving a call through the API, the on-demand code execution system may dynamically generate an execution environment for the code, provision the environment with the code, execute the code, and provide a result. Thus, an on-demand code execution system can remove a need for a user to handle configuration and management of environments for code execution. Due to the flexibility of on-demand code execution system to execute arbitrary function code, such a system can be used to create a variety of network services. For example, such a system could be used to create a "micro-service," a network service that implements a small number of functions (or only one function), and that interacts with other services to provide an application. In the context of on-demand code execution systems, the instance of function code executing to provide such a service is often referred to as an "invoked function," or simply as an "invoke" or "function" for brevity.

The infrastructure or configuration of an on-demand code execution system may place certain limitations on data access and sharing. In some cases, these limitations can interfere with or prevent use of the on-demand code execution system to execute individual functions that collectively provide an application or otherwise interact with and share data sets. For example, it may be desirable to access large data sets to perform certain functions. However, because each function loads the data set to work with it, and then the execution environment of each function is cleared after execution of each function has completed, any subsequent function working with the same data set must similarly load the data set first. This can be disadvantageous in the case of large data sets due to the cumulative effect on the network bandwidth and function execution time required to repeatedly load large data sets. Application developers using on-demand functions to build applications that need to process large amounts of data or share state across function instances can in some cases work around the loading and clearing of function data. However, to do so the application developers are required to do the complex design and implementation work to bring state into on-demand execution of functions and to synchronize that state across multiple functions. Moreover, in some data center environments it may not be permissible or possible to transfer extremely large data sets (e.g., 10s or 100s of gigabytes) from remote storage for access by an instance of function code executing on dynamically-provisioned hardware of an on-demand code execution system. Additionally, because function code is loaded onto and executed by a host computing system that is dynamically selected and provisioned at the time execution of the function code is requested or scheduled, it is difficult or impossible to store a data set locally on the host computing device and ensure that all functions requiring access to the data set will be similarly executed by the same host computing device or even on a host computing device that is nearby (in either a physical or logical networking sense).

Some aspects of the present disclosure address some or all of the issues noted above, among others, through an improved on-demand code execution system that automatically manages data movement and access for instances of function code. In some embodiments, a set of functions can be associated with configuration data that specifies data sets (e.g., objects, block storage volumes, tables, files, etc.) to be made available to the functions when the functions are invoked. For example, a customer of the on-demand code execution system may provide configuration data specifying data sets to be made available to the customer's functions when they are invoked on the on-demand code execution system. Advantageously, such data sets may be automatically made available to the functions when the functions initially begin execution, without requiring any specific priming or loading step to be performed by the functions before the data is accessed. Such data sets may therefore be referred to as "initial data sets" due to their availability when the functions initially begin execution.

In some embodiments, the initial data sets may be available through standard local file system access methods or API calls, such as those used to issue read and write requests to the local file system (e.g., "/data/foo.txt", where "/data" is a construct that would typically be used by a function to access the "data" directory of local storage). As used herein, the term "local file system" generally refers to a file system as maintained within an execution environment, such that a function executing within the environment can access data as a file, rather than via a network connection. The data storage accessible via a local file system may itself be local (e.g., local physical storage), or may be remote (e.g., accessed via a network protocol, or represented as a virtualized block device provided by a network-accessible service). Thus, the term "local file system" is intended to describe a mechanism for software to access data, rather than a physical location of the data. Accordingly, the initial data sets may appear to the function as part of the local file system regardless of whether the current physical location of the data is on a local physical storage device or a network-accessible storage system.

Additional aspects of the present disclosure relate to efficient provision of initial data sets to function instances. In some embodiments, when a function is invoked, data sets referenced in configuration data associated with the function instance may be loaded from a network-accessible source data storage system and placed in a cache that is close to (in a networking sense) a host computing device in the on-demand code execution system and on which the function instance is invoked. Data access metadata associated with the function may be generated or updated to reflect the current location of the data sets so that the on-demand code execution system can provide the cached data sets (or portions thereof) to the function instance. Illustratively, when the function instance requests to read a data set or portion thereof (e.g., "open('/data/foo.txt')"), the requested data may be copied from the cache to a host device on which the function instance is executing so that the requested data can be accessed efficiently. Once a portion of data has been copied to the host device in this manner, the data access metadata for the function may be updated to reflect the current location of the data. Data access metadata may be maintained in this way as data sets and individual data items are requested, modified, or otherwise accessed. This method of data access and maintenance may be referred to as "lazy loading."

Further aspects of the present disclosure relate to sharing of data across function instances. In some embodiments, data access metadata (or portions thereof) may in some cases be shared across multiple function instances so that the on-demand code execution system can provide efficient access to initial data sets without retrieving the initial data sets from the source data storage system each time a function is invoked. For example, if a second function associated with the same configuration data regarding the same initial data sets is invoked, the on-demand code execution system can forgo caching the data sets from the source data storage system to the cache, and instead access requested data from the cache. Thus, the data access metadata for a given function instance may be generated or modified to reflect the "closest" location (in a networking sense) of each data object when the function is invoked, without necessarily requiring actual movement of data.

In some embodiments, data modified by one function instance can be made available to another instance of the same function or an instance of a different function. For example, one function instance may modify a portion of an initial data set, and save the modification to a local data store. The function instance may then invoke another function instance, or another function instance may be otherwise invoked, to operate on the modified data. To provide the other function instance with access to the modified data, a data reference to the modified data may be provided. When the other function instance is invoked, the data reference may be used to copy the modified data to local storage available to the other function stance. In this way, there may be a degree of state sharing across functions.

Various aspects of the disclosure will be described with regard to certain examples and embodiments, which are intended to illustrate but not limit the disclosure. Although aspects of some embodiments described in the disclosure will focus, for the purpose of illustration, on particular examples of function code, data sets, and on-demand code execution system configurations, the examples are illustrative only and are not intended to be limiting. In some embodiments, the techniques described herein may be applied to additional or alternative types of function code (e.g., subroutines), data sets, and on-demand code execution system configurations. Additionally, any feature used in any embodiment described herein may be used in any combination with any other feature or in any other embodiment, without limitation.

Example Network Environment

An on-demand code execution system may provide a network-accessible service enabling users to submit or designate computer-executable source code—also referred to herein as "function code," or simply as "code" for brevity—to be executed by virtual machine instances on the on-demand code execution system. Each set of function code on the on-demand code execution system may define a "task," and implement specific functionality corresponding to that task when executed on a virtual machine instance of the on-demand code execution system. Individual implementations of the task on the on-demand code execution system may be referred to as an "execution" of the task (or a "task execution"). In some cases, the on-demand code execution system may enable users to directly trigger execution of a task based on a variety of potential events, such as transmission of an API or specially formatted hypertext transport protocol ("HTTP") packet to the on-demand code execution system. The on-demand code execution system can therefore execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user). To enable this rapid execution, the on-demand code execution system can include one or more virtual machine instances that are "pre-warmed" or pre initialized (e.g., booted into an operating system and executing a complete or substantially complete runtime environment) and configured to enable execution of user-defined code, such that the code may be rapidly executed in response to a request to execute the code, without delay caused by initializing the virtual machine instance. Thus, when an execution of a task is triggered, the code corresponding to that task can be executed within a pre-initialized virtual machine in a very short amount of time.

Specifically, to execute tasks, the on-demand code execution system described herein may maintain a pool of executing virtual machine instances that are ready for use as soon as a request to execute a task is received. Due to the pre initialized nature of these virtual machines, delay (sometimes referred to as latency) associated with executing the task code (e.g., instance and language runtime startup time) can be significantly reduced, often to sub 100 millisecond levels. Illustratively, the on-demand code execution system may maintain a pool of virtual machine instances on one or more physical computing devices, where each virtual machine instance has one or more software components (e.g., operating systems, language runtimes, libraries, etc.) loaded thereon. When the on-demand code execution system receives a request to execute program code (a "task"), the on-demand code execution system may select a virtual machine instance for executing the program code of the user based on the one or more computing constraints related to the task (e.g., a required operating system or runtime) and cause the task to be executed on the selected virtual machine instance. The tasks can be executed in isolated containers that are created on the virtual machine instances, or may be executed within a virtual machine instance isolated from other virtual machine instances acting as environments for other tasks. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) can be significantly reduced.

As used herein, the term "virtual machine instance" is intended to refer to an execution of software or other executable code that emulates hardware to provide an environment or platform on which software may execute (an example "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

FIG. 1 is a block diagram of an illustrative operating environment 100 in which a service provider system 110 operates to enable client devices 102 to submit or request invocation of user-defined code by an on-demand code execution system 120.

By way of illustration, various example client devices 102 are shown in communication with the service provider system 110, including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set top box, voice command device, camera, digital media player, and the like.

Generally described, the data storage service 160 can operate to enable clients to read, write, modify, and delete data, such as files, objects, blocks, or records, each of which represents a set of data associated with an identifier (an "object identifier" or "resource identifier") that can be interacted with as an individual resource. For example, an object may represent a single file submitted by a client device 102 (though the data storage service 160 may or may not store such an object as a single file). This object-level interaction can be contrasted with other types of storage services, such as block-based storage in which data is manipulated at the level of individual blocks or database storage in which data manipulation may occur at the level of tables or the like.

The data storage service 160 illustratively includes one or more frontends 162, which provide an interface (a command-line interface (CLIs), application programing interface (APIs), or other programmatic interface) through which client devices 102 can interface with the service 160 to configure the service 160 on their behalf and to perform I/O operations on the service 160. For example, a client device 102 may interact with a frontend 162 to create a collection of data objects on the service 160 (e.g., a "bucket" of objects) and to configure permissions for that collection. Client devices 102 may thereafter create, read, update, or delete objects within the collection based on the interfaces of the frontends 162. In one embodiment, the frontend 162 provides a REST-compliant HTTP interface supporting a variety of request methods, each of which corresponds to a requested I/O operation on the service 160. By way of non-limiting example, request methods may include:
- a GET operation requesting retrieval of an object stored on the service 160 by reference to an identifier of the object;
- a PUT operation requesting storage of an object to be stored on the service 160, including an identifier of the object and input data to be stored as the object;
- a DELETE operation requesting deletion of an object stored on the service 160 by reference to an identifier of the object; and
- a LIST operation requesting listing of objects within an object collection stored on the service 160 by reference to an identifier of the collection.

A variety of other operations may also be supported.

During general operation, frontends 162 may be configured to obtain a call to a request method, and apply that request method to input data for the method. For example, a frontend 162 can respond to a request to PUT input data into the service 160 as an object by storing that input data as the object on the service 160.

Data may be stored, for example, on data stores 168, which correspond to any persistent or substantially persistent storage (including hard disk drives (HDDs), solid state drives (SSDs), network accessible storage (NAS), storage area networks (SANs), non-volatile random access memory (NVRAM), or any of a variety of storage devices known in the art). As a further example, the frontend 162 can respond to a request to access a data set or portion thereof from the service 160 by retrieving the requested data from the stores 168 (e.g., an object representing input data to a GET resource request), and returning the object to a requesting client device 102.

In some cases, calls to a request method may invoke one or more native data manipulations provided by the service 160. For example, a SELECT operation may provide an SQL-formatted query to be applied to an object (also identified within the request), or a GET operation may provide a specific range of bytes of an object to be returned.

The service provider system 110 illustratively includes a cache service 170 configured to cache data sets for code executed by the on-demand code execution system 120. Data may be cached, for example, on data caches 172, which correspond to any data storage such hard disk drives (HDDs), solid state drives (SSDs), network accessible storage (NAS), storage area networks (SANs), non-volatile random-access memory (NVRAM), random access memory (RAM), or any of a variety of storage devices known in the art. Although illustrated as separate and outside of the data storage service 160 and the on-demand code execution system 120, in some embodiments the cache service 170 may be implemented within one or both of the data storage service 160 or on-demand code execution system 120 (e.g., on physical or logical commuting systems that are part of the data storage service 160 or on-demand code execution system 120).

The client devices 102, data storage service 160, cache service 170, and on-demand code execution system 120 may communicate via one or more communication networks, which may include any wired network, wireless network, or combination thereof. For example, network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long-Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The system 120 includes one or more frontends 130 which enable interaction with the on-demand code execution system 120. In an illustrative embodiment, the frontends 130 serve as a "front door" to the other services provided by the on-demand code execution system 120, enabling users (via client devices 102) to provide, request execution of, and view results of computer executable code. The frontends 130 include a variety of components to enable interaction between the on-demand code execution system 120 and other computing devices. For example, each frontend 130 may include a request interface providing client devices 102 with the ability to upload or otherwise communicate user-specified code to the on-demand code execution system 120 and to thereafter request execution of that code. In one embodiment, the request interface communicates with external computing devices (e.g., client devices 102, frontend 162, etc.) via a graphical user interface (GUI), CLI, or API. The frontends 130 process the requests and make sure that the requests are properly authorized. For example, the frontends 130 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," "function code," and "program code," may be used interchangeably. Such user code may be executed to achieve a specific function, for example, in connection with a particular data transformation developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written, by way of non-limiting example, in JavaScript (e.g., node.js), Java, Python, or Ruby (or another programming language).

To manage requests for code execution, the frontend 130 can include an execution queue, which can maintain a record of requested task executions. Illustratively, the number of simultaneous task executions by the on-demand code execution system 120 is limited, and as such, new task executions initiated at the on-demand code execution system 120 (e.g., via an API call, via a call from an executed or executing task, etc.) may be placed on the execution queue and processed, e.g., in a first-in-first-out order. In some embodiments, the on-demand code execution system 120 may include multiple execution queues, such as individual execution queues for each user account. For example, users of the service provider system 110 may desire to limit the rate of task executions on the on-demand code execution system 120 (e.g., for cost reasons). Thus, the on-demand code execution system 120 may utilize an account-specific execution queue to throttle the rate of simultaneous task executions by a specific user account. In some instances, the on-demand code execution system 120 may prioritize task executions, such that task executions of specific accounts or of specified priorities bypass or are prioritized within the execution queue. In other instances, the on-demand code execution system 120 may execute tasks immediately or substantially immediately after receiving a call for that task, and thus, the execution queue may be omitted.

The frontend 130 can further include an output interface configured to output information regarding the execution of tasks on the on-demand code execution system 120. Illustratively, the output interface may transmit data regarding task executions (e.g., results of a task, errors related to the task execution, or details of the task execution, such as total time required to complete the execution, total data processed via the execution, etc.) to the client devices 102 or the data storage service 160.

In some embodiments, the on-demand code execution system 120 may include multiple frontends 130. In such embodiments, a load balancer may be provided to distribute the incoming calls to the multiple frontends 130, for example, in a round-robin fashion. In some embodiments, the manner in which the load balancer distributes incoming calls to the multiple frontends 130 may be based on the location or state of other components of the on-demand code execution system 120. For example, a load balancer may distribute calls to a geographically nearby frontend 130, or to a frontend with capacity to service the call. In instances where each frontend 130 corresponds to an individual instance of another component of the on-demand code execution system 120, such as the active pool 148 described below, the load balancer may distribute calls according to the capacities or loads on those other components. Calls may in some instances be distributed between frontends 130 deterministically, such that a given call to execute a task will always (or almost always) be routed to the same frontend 130. This may, for example, assist in maintaining an accurate execution record for a task, to ensure that the task executes only a desired number of times. For example, calls may be distributed to load balance between frontends 130. Other distribution techniques, such as anycast routing, will be apparent to those of skill in the art.

The on-demand code execution system 120 further includes one or more worker managers 140 that manage the execution environments, such as virtual machine instances 150 (shown as VM instance 150A and 150B, generally referred to as a "VM"), used for servicing incoming calls to execute tasks. While the following will be described with reference to virtual machine instances 150 as examples of such environments, embodiments of the present disclosure may utilize other environments, such as software containers. In the example illustrated in FIG. 1, each worker manager 140 manages an active pool 148, which is a group (sometimes referred to as a pool) of virtual machine instances 150 executing on one or more physical host computing devices that are initialized to execute a given task (e.g., by having the code of the task and any dependency data objects loaded into the instance).

Although the virtual machine instances 150 are described here as being assigned to a particular task, in some embodiments, the instances may be assigned to a group of tasks, such that the instance is tied to the group of tasks and any tasks of the group can be executed within the instance. For example, the tasks in the same group may belong to the same security group (e.g., based on their security credentials) such that executing one task in a container on a particular instance 150 after another task has been executed in another container on the same instance does not pose security risks. A task may be associated with permissions encompassing a variety of aspects controlling how a task may execute. For example, permissions of a task may define what network connections (if any) can be initiated by an execution environment of the task. As another example, permissions of a task may define what authentication information is passed to a task, controlling what network-accessible resources are accessible to execution of a task (e.g., objects on the service 160). In one embodiment, a security group of a task is based on one or more such permissions. For example, a security group may be defined based on a combination of permissions to initiate network connections and permissions to access network resources. As another example, the tasks of the group may share common dependencies, such that an environment used to execute one task of the group can be rapidly modified to support execution of another task within the group.

Once a triggering event to execute a task has been successfully processed by a frontend 130, the frontend 130 passes a request to a worker manager 140 to execute the task. In one embodiment, each frontend 130 may be associated with a corresponding worker manager 140 (e.g., a worker manager 140 co-located or geographically nearby to the frontend 130) and thus, the frontend 130 may pass most or all requests to that worker manager 140. In another embodiment, a frontend 130 may include a location selector configured to determine a worker manager 140 to which to pass the execution request. In one embodiment, the location selector may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

Thereafter, the worker manager 140 may modify a virtual machine instance 150 (if necessary) and execute the code of the task within the instance 150. As shown in FIG. 1, respective instances 150 may have operating systems (OS) 152 (shown as OS 152A and 152B), language runtimes 154 (shown as runtime 154A and 154B), and user code 156 (shown as user code 156A and 156B). The OS 152, runtime 154, and user code 156 may collectively enable execution of the user code to implement the task. Thus, via operation of the on-demand code execution system 120, tasks may be rapidly executed within an execution environment.

In accordance with aspects of the present disclosure, each VM 150 additionally includes staging code 157 executable to facilitate staging of input data on the VM 150 and handling of output data written on the VM 150, as well as a VM data store 158 accessible through a local file system of the VM 150. Illustratively, the staging code 157 represents a process executing on the VM 150 (or potentially a host device of the VM 150) and configured to obtain data from the data storage service 160 or cache service 170 and place that data into the VM data store 158. The staging code 157 can further be configured to obtain data written to a file within the VM data store 158, and to transmit that data to the data storage service 160 or cache service 170. Because such data is available at the VM data store 158, user code 156 is not required to obtain data over a network, simplifying user code 156 and enabling further restriction of network communications by the user code 156, thus increasing security. Rather, as discussed above, user code 156 may interact with input data and output data as files on the VM data store 158, by use of file handles passed to the code 156 during an execution. In some embodiments, input and output data may be stored as files within a kernel-space file system of the data store 158. In other instances, the staging code 157 may provide a virtual file system, such as a filesystem in user-space (FUSE) interface, which provides an isolated file system accessible to the user code 156, such that the user code's access to the VM data store 158 is restricted.

As used herein, the term "local file system" generally refers to a file system as maintained within an execution environment, such that software executing within the environment can access data as a file, rather than via a network connection. In accordance with aspects of the present disclosure, the data storage accessible via a local file system may itself be local (e.g., local physical storage), or may be remote (e.g., accessed via a network protocol, like NFS, or represented as a virtualized block device provided by a network-accessible service). Thus, the term "local file system" is intended to describe a mechanism for software to access data, rather than physical location of the data.

The VM data store 158 can include any persistent or non-persistent data storage device. In one embodiment, the VM data store 158 is physical storage of the host device, or a virtual disk drive hosted on physical storage of the host device. In another embodiment, the VM data store 158 is represented as local storage, but is in fact a virtualized storage device provided by a network accessible service. For example, the VM data store 158 may be a virtualized disk drive provided by a network-accessible block storage service. In some embodiments, the data storage service 160 may be configured to provide file-level access to objects stored on the data stores 168, thus enabling the VM data store 158 to be virtualized based on communications between the staging code 157 and the service 160. For example, the data storage service 160 can include a file-level interface providing network access to objects within the data stores 168 as files. The file-level interface may, for example, represent a network-based file system server (e.g., a network file system (NFS)) providing access to objects as files, and the staging code 157 may implement a client of that server, thus providing file-level access to objects of the service 160.

In some instances, the VM data store 158 may represent virtualized access to another data store executing on the same host device of a VM instance 150. For example, an active pool 148 may include one or more data staging VM instances (not shown in FIG. 1), which may be co-tenanted with VM instances 150 on the same host device. A data staging VM instance may be configured to support retrieval and storage of data from the service 160 (e.g., data objects or portions thereof, input data passed by client devices 102, etc.), and storage of that data on a data store of the data staging VM instance. The data staging VM instance may, for example, be designated as unavailable to support execution of user code 156, and thus be associated with elevated permissions relative to instances 150 supporting execution of user code. The data staging VM instance may make this data accessible to other VM instances 150 within its host device (or, potentially, on nearby host devices), such as by use of a network-based file protocol, like NFS. Other VM instances 150 may then act as clients to the data staging VM instance, enabling creation of virtualized VM data stores 158 that, from the point of view of user code 156A, appear as local data stores. Beneficially, network-based access to data stored at a data staging VM can be expected to occur very quickly, given the co-location of a data staging VM and a VM instance 150 within a host device or on nearby host devices.

While some examples are provided herein with respect to use of IO stream handles to read from or write to a VM data store 158, IO streams may additionally be used to read from or write to other interfaces of a VM instance 150 (while still removing a need for user code 156 to conduct operations other than stream-level operations, such as creating network connections). For example, staging code 157 may "pipe" input data to an execution of user code 156 as an input stream, the output of which may be "piped" to the staging code 157 as an output stream. As another example, a staging VM instance or a hypervisor to a VM instance 150 may pass input data to a network port of the VM instance 150, which may be read—from by staging code 157 and passed as an input stream to the user code 157. Similarly, data written to an output stream by the task code 156 may be written to a second network port of the instance 150A for retrieval by the staging VM instance or hypervisor. In yet another example, a hypervisor to the instance 150 may pass input data as data written to a virtualized hardware input device (e.g., a keyboard) and staging code 157 may pass to the user code 156 a handle to the IO stream corresponding to that input device. The hypervisor may similarly pass to the user code 156 a handle for an IO stream corresponding to a virtualized hardware output device, and read data written to that stream as output data. Thus, the examples provided herein with respect to file streams may generally be modified to relate to any IO stream.

The data storage service 160, cache service 170, and on-demand code execution system 120 are depicted in FIG. 1 as operating in a distributed computing environment including several computer systems that are interconnected using one or more computer networks (not shown in FIG. 1). The data storage service 160, cache service 170, and on-demand code execution system 120 could also operate within a computing environment having a fewer or greater number of devices than are illustrated in FIG. 1. Thus, the depiction of the data storage service 160, cache service 170, and on-demand code execution system 120 in FIG. 1 should be taken as illustrative and not limiting to the present disclosure. For example, the on-demand code execution system 120 or various constituents thereof could implement various Web services components, hosted or "cloud" computing environments, or peer to peer network configurations to implement at least a portion of the processes described herein. In some instances, the data storage service 160, cache service 170, and on-demand code execution system 120 may be combined into a single service. Further, the data storage service 160, cache service 170, and on-demand code execution system 120 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the data storage service 160, cache service 170, and on-demand code execution system 120 are illustrated as connected to the network 104. In some embodiments, any of the components within the data storage service 160, cache service 170, and on-demand code execution system 120 can communicate with other components of the on-demand code execution system 120 via the network 104. In other embodiments, not all components of the data storage service 160, cache service 170, and on-demand code execution system 120 are capable of communicating with other components of the virtual environment 100. In one example, only the frontends 130 and 162 (which may in some instances represent multiple frontends) of the on-demand code execution system 120 and the data storage service 160, respectively, may be connected to the network 104, and other components of the data storage service 160 and on-demand code execution system 120 may communicate with other components of the environment 100 via the respective frontends 130 and 162.

While some functionalities are generally described herein with reference to an individual component of the data storage service 160, cache service 170, and on-demand code execution system 120, other components or a combination of components may additionally or alternatively implement such functionalities. Thus, the specific configuration of elements within FIG. 1 is intended to be illustrative.

Figure 2:
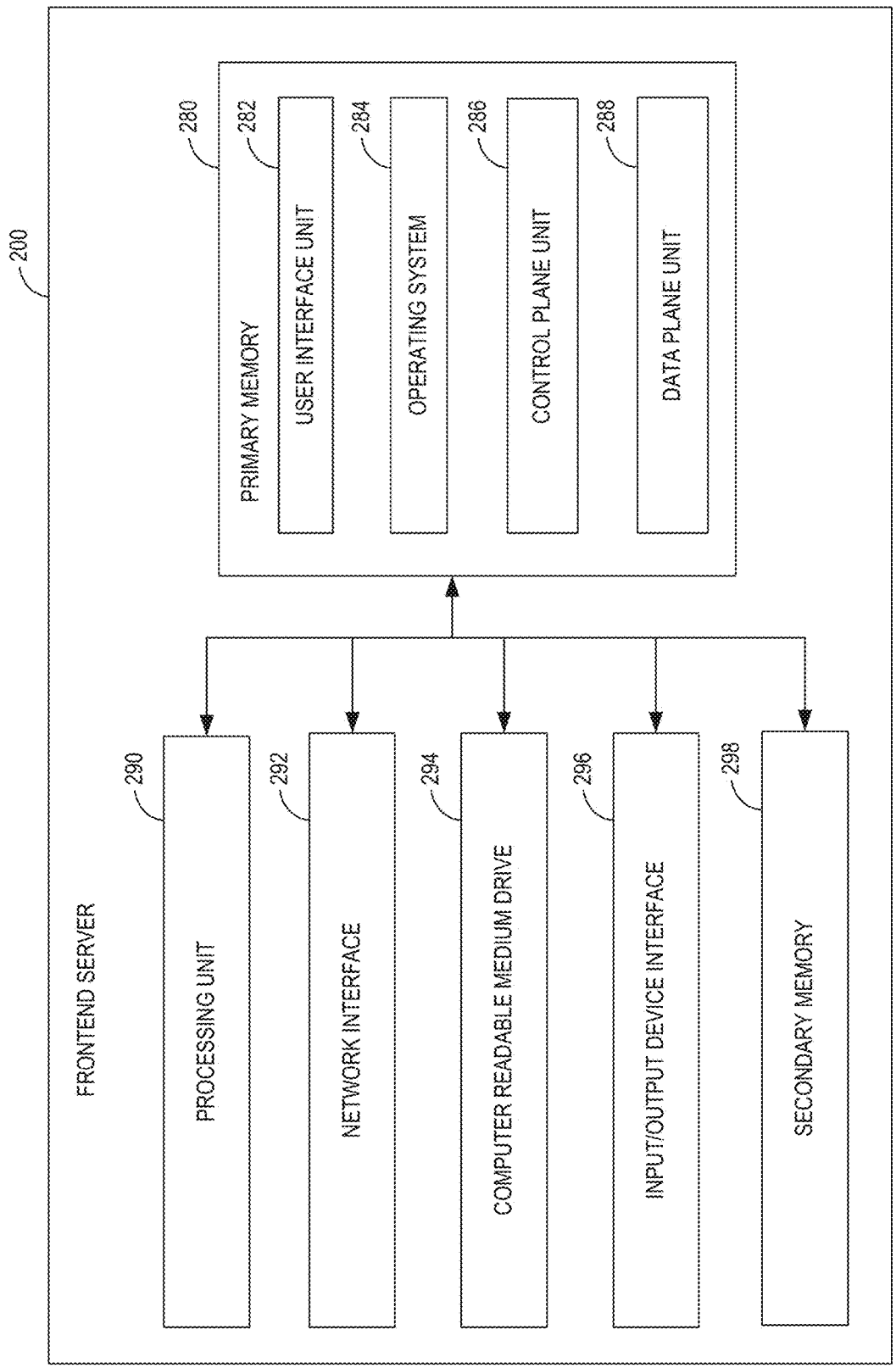
FIG. 2 is a block diagram of an illustrative computing system configured to provide data management across function invocations in the on-demand code execution system according to some embodiments.

FIG. 2 depicts a general architecture of a frontend server 200 computing device implementing a frontend 162 of FIG. 1. The general architecture of the frontend server 200 depicted in FIG. 2 includes an arrangement of computer hardware and software that may be used to implement aspects of the present disclosure. The hardware may be implemented on physical electronic devices, as discussed in greater detail below. The frontend server 200 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1.

As illustrated, the frontend server 200 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from primary memory 280 or secondary memory 298 and further provide output information for an optional display (not shown) via the input/output device interface 296. The input/output device interface 296 may also accept input from an optional input device (not shown).

The primary memory 280 or secondary memory 298 may contain computer program instructions (grouped as units in some embodiments) that the processing unit 290 executes in order to implement one or more aspects of the present disclosure. These program instructions are shown in FIG. 2 as included within the primary memory 280, but may additionally or alternatively be stored within secondary memory 298. The primary memory 280 and secondary memory 298 correspond to one or more tiers of memory devices, including (but not limited to) RAM, 3D XPOINT memory, flash memory, magnetic storage, and the like. The primary memory 280 is assumed for the purposes of description to represent a main working memory of the worker manager 140, with a higher speed but lower total capacity than secondary memory 298.

The primary memory 280 may store an operating system 284 that provides computer program instructions for use by the processing unit 290 in the general administration and operation of the frontend server 200. The memory 280 may further include computer program instructions and other information for implementing aspects of the present disclosure. For example, in one embodiment, the memory 280 includes a user interface unit 282 that generates user interfaces (or instructions therefor) for display upon a computing device, e.g., via a navigation or browsing interface such as a browser or application installed on the computing device.

The memory 280 may include a control plane unit 286 and data plane unit 288 each executable to implement aspects of the present disclosure. Illustratively, the control plane unit 286 may include code executable to enable definition or submission of function code to be executed. The data plane unit 288 may illustratively include code enabling handling of I/O operations on the data storage service 160 or cache service 170, including retrieving data sets, generating data references to be used by other functions to access the data sets, caching the data sets, etc.

The frontend server 200 of FIG. 2 is one illustrative configuration of such a device, of which others are possible. For example, while shown as a single device, a frontend server 200 may in some embodiments be implemented as multiple physical host devices. Illustratively, a first device of such a frontend server 200 may implement the control plane unit 286, while a second device may implement the data plane unit 288.

While described in FIG. 2 as a frontend server 200, similar components may be utilized in some embodiments to implement other devices shown in the environment 100 of FIG. 1. For example, a similar device may implement a worker manager 140, as described in more detail in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 Patent"), the entirety of which is hereby incorporated by reference.

Example Cross-Function Data Management

Figure 3:
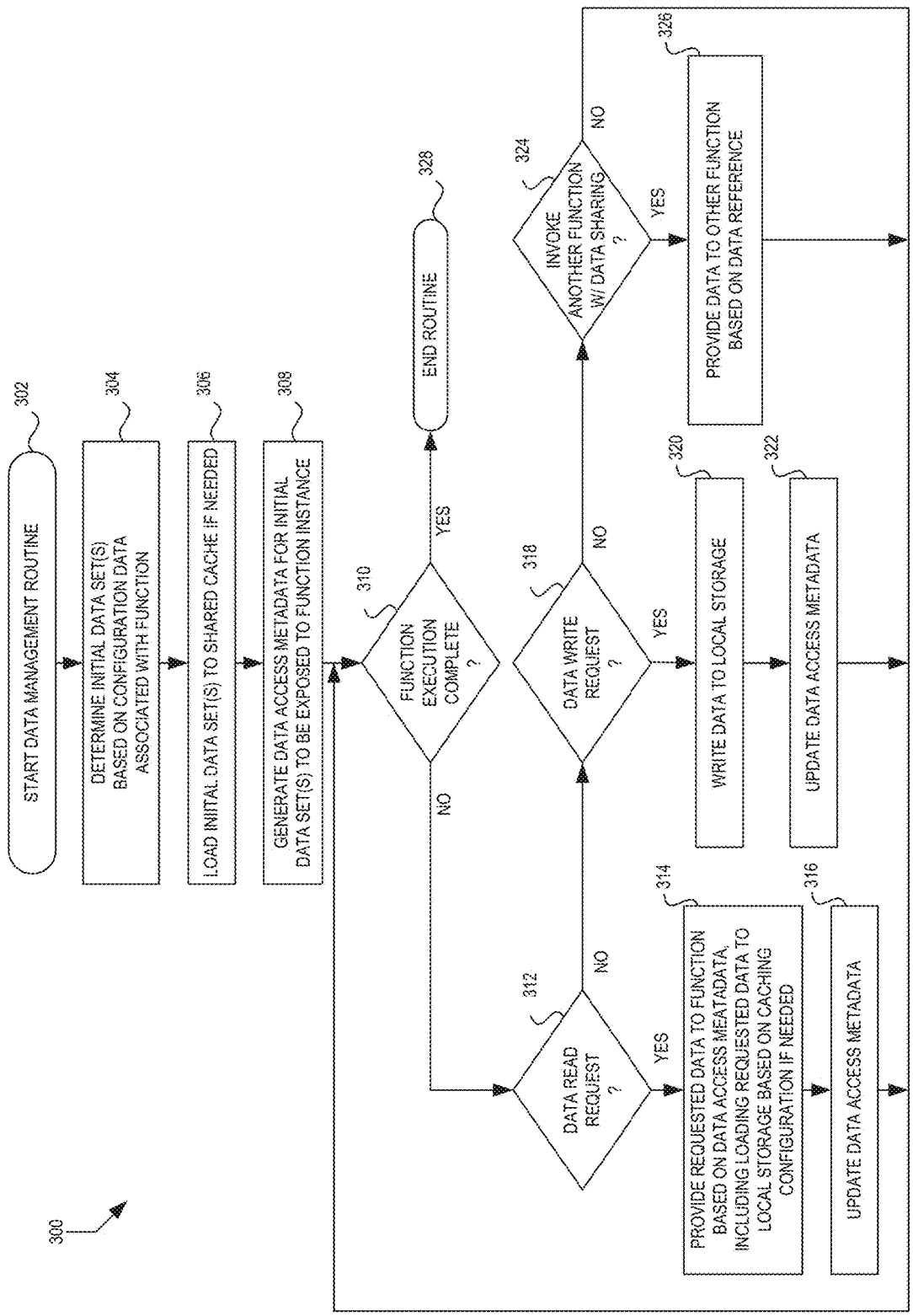
FIG. 3 is a flow diagram of an illustrative routine for managing data access within and across function invocations in the on-demand code execution system according to some embodiments.

FIG. 3 illustrates example routine 300 for managing provision of network-stored data sets among instances of function code executing in an on-demand manner. Advantageously, a component or subsystem of the on-demand code execution system 120, such as a frontend 130, worker manager 140, some other component, or a combination thereof may execute the routine 300 to make initial data sets available efficiently and to make the initial data sets accessible within function invocations in a manner that is similar or identical to accessing locally-stored data sets. Moreover, the data sets may, when desired, be made available persistently across function invocations.

The routine 300 begins at block 302. The routine may begin in response to an event, such as receipt by the on-demand code execution system 120 of a request to invoke a function defined by function code. For example, a frontend 130 may receive an invocation request from a client device 102, a VM instance, a previously-invoked function executing within the on-demand code execution system 120, etc. In the description that follows, in order to distinguish the function currently being invoked from other functions (e.g., previously-invoked functions, subsequently-invoked functions, concurrently-invoked functions running in a parallel instance of routine 300, etc.), the function currently being invoked will be referred to as the "current function."

At block 304, the on-demand code execution system 120 can determine one or more initial data sets to be provisioned to the function. To determine the initial data sets, the on-demand code execution system 120 can access configuration data associated with the function. In some embodiments, the function may be defined by or invoked at the direction of a particular customer that generated configuration data regarding the initial data set(s) to be provisioned for some or all functions of the customer. For example, configuration data may specify a network-accessible source data store from which a particular object or set of objects is to be made available to the function. The configuration data may be associated with the function code specifically and/or the customer in general (e.g., by identifiers, mapping records, or the like).

Figure 4:
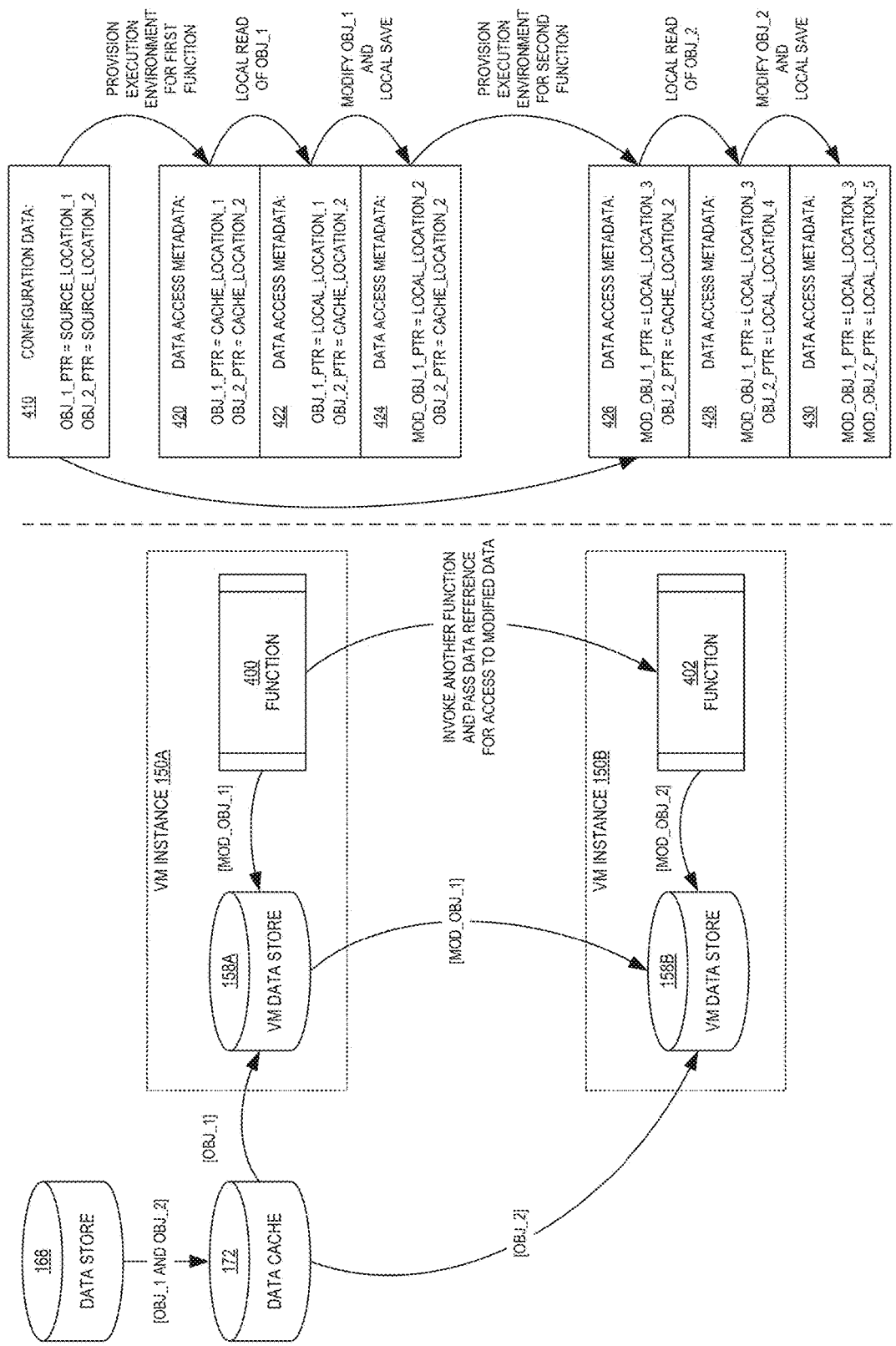
FIG. 4 is a block diagram of illustrative data flows and interactions during sequential invocation of on-demand code with passing of data between functions according to some embodiments.

FIG. 4 illustrates an example in which function 400 is invoked for execution on VM instance 150A. Function 400 is associated with configuration data 410 that specifies initial data sets to be made available to the function 400. As shown, configuration data 410 includes data defining pointers for two objects: OBJ_1_PTR for an object at SOURCE_LOCATON_1 and OBJ_2_PTR for an object at SOURCE-LOCATION_2. The particular storage locations may be within data store 168, which is a network-accessible data store of data storage service 160.

Although FIG. 4 shows configuration data defining pointers for two objects, the example is provided for illustrative purposes only and is not intended to be limiting, required, or exhaustive. In some embodiments, there may be a different quantity of initial data sets referenced in the configuration data. In some embodiments, there may be different types of data referenced in the configuration data instead of, or in addition to, data objects. For example, configuration data may reference tables, block storage volumes, files, etc.

At block 306, the on-demand code execution system 120 can in some embodiments load the initial data sets to a shared cache, if needed. In the example shown in FIG. 4, the on-demand code execution system 120 uses the configuration data to obtain copies of OBJ_1 and OBJ_2 from STORAGE_LOCATION_1 and STORAGE_LOCATION_2, respectively, of the data store 168. The on-demand code execution system 120 stores the copies in data cache 172. Data cache 172 may be located closer to VM instance 150A in a networking sense (e.g., number of network hops) than is data store 168, and therefore copying OBJ_1 and OBJ_2 to the data cache 172 can improve read performance of the function 400 (e.g., as defined in terms of read latency).

At block 308, the on-demand code execution system 120 can generate data access metadata for the initial data sets. The data access metadata can be used to determine the current location of the initial data sets in response to data access operations of the function 400. In the example shown in FIG. 4, the on-demand code execution system 120 generates data access metadata 420 defining pointers for two initial data sets: OBJ_1_PTR indicates that OBJ_1 is at CACHE_LOCATON_1, while OBJ_2_PTR indicates that OBJ_2 is at CACHE-LOCATION_2. The particular storage locations may be within cache 172 due to loading of the initial data sets to the cache as described above.

At decision block 310, the on-demand code execution system 120 can determine whether execution of the current function has completed. The current function may perform operations, access data, generate data, and so on. If the function is continuing to execute, the routine may proceed to decision block 312. Once the function has completed execution, the routine 300 may end at block 328.

At decision block 312, the on-demand code execution system 120 can determine whether the current function has requested to read data of an initial data set. In some embodiments, a read request may be made as a local file system read operation. For example, the initial data sets may be exposed via a predetermined directory of the local file system (e.g., "/data"), even if the initial data sets are not currently stored in the VM data store 158A or some other data store that is physical local to host device on which the VM instance 150A and function 400 are executing. If a read request has been made, the routine 300 may proceed to block 314; otherwise, the routine 300 may proceed to decision block 318.

At block 314, the on-demand code execution system 120 can provide the requested data from an initial data set to the current function based on the data access metadata. For example, the on-demand code execution system 120 can determine the current location of the requested data as specified in the data access metadata, and obtain the requested data from the indicated location. In order to allow the current function with continued rapid access to the requested data, the on-demand code execution system 120 may in some embodiments load the requested data to local storage that is physically local to the host computing device on which the function is executing.

At block 316, the on-demand code execution system 120 can in some embodiments update data access metadata. The update may be performed if the requested data has been copied to local storage in response to the most-recent read request above. The update may be made so that for future read requests by the current function for the same data, the requested data can be obtained from local storage rather than from a cache or network-accessible storage.

In the example shown in FIG. 4, the function 400 has requested OBJ_1 using a local file system read command. The data access metadata 420 indicates the current location of OBJ_1 is at CACHE_LOCATION_1, which is in data cache 172. The on-demand code execution system 120 copies OBJ_1 from data cache 172 to VM data store 158A, where OBJ_1 is locally available to function 400. The on-demand code execution system 120 also modifies data access metadata 420 to generate data access metadata 422, which indicates that the current location for OBJ_1 is LOCAL_LOCATION_1.

At decision block 318, the on-demand code execution system 120 can determine whether the current function has requested to write data (e.g., a modified version of data) in an initial data set. In some embodiments, a write request may be made as a local file system write operation. For example, the initial data sets may be exposed via a predetermined directory of the local file system (e.g., "/data"), even if the initial data sets are not currently stored in the VM data store 158A or some other data store that is physical local to host device on which the VM instance 150A and function 400 are executing. If a write request has been made, the routine 300 may proceed to block 320; otherwise, the routine 300 may proceed to decision block 324.

At block 320, the data generated or modified by the current function can be written to local storage. In order to allow the current function with continued rapid access to the written data, the on-demand code execution system 120 may in some embodiments write the requested data to local storage that is physically local to the host computing device on which the function is executing.

At block 322, the on-demand code execution system 120 can in some embodiments update data access metadata. The update may be performed so that for future read requests for the written data, the data can be obtained in the same manner as other data associated with initial data sets: by using the data access metadata.

In the example shown in FIG. 4, the function 400 has written MOD_OBJ_1 using a local file system write command. The data is written to the VM data store 158A that is locally-available to the function 400. The on-demand code execution system 120 modifies data access metadata 422 to generate data access metadata 424, which indicates that the current location for MOD_OBJ_1 is in LOCAL_LOCATION_2. In some embodiments, the modified data may be written to a different location than the original local storage location for OBJ_1 because the initial data sets (and individual objects thereof) may be immutable. Thus, the modified data is not automatically made available to other functions by copying the modified data to the data cache 172 or source data store 168. Rather, other mechanisms may be used to share modified data with other functions, as described below.

At decision block 324, the on-demand code execution system 120 can determine whether the current function is invoking another function and sharing data with the other function. In some embodiments, the initial data sets are immutable, and therefore modifications (including additions) to an initial data set by a function are not written back to the source data store and are not otherwise made available automatically other functions. In such cases, in order for initial data set modifications (including additions) made by one function to be available to other functions, a data reference to data in local storage of the host device on which a function is executing can be passed to another function. For example, the data reference may be the same as, or similar to, data access metadata. If a function invocation request with a data reference has been made, the routine 300 may proceed to block 326; otherwise, the routine 300 may return to decision block 310.

At block 326, the on-demand code execution system 120 can the data, created or modified by the current function, to the other function based on the data reference associated with invocation of the other function.

As shown in FIG. 4, the on-demand code execution system 120 can provision an execution environment, such as VM instance 150B, for execution of function 402. The execution environment many include local storage for function 402, such as VM data store 158B. As part of the process of provisioning the execution environment, the on-demand code execution system 120 can use configuration data 410 and/or data access metadata 424 to provide initial data sets for the function. For example, configuration data 410 specifies two initial data sets OBJ_1 and OBJ_2, referenced by pointers OBJ_1_PTR and OBJ_2_PTR, respectively. However, because function 400 has already been invoked and provided with access to the initial data sets, and because such provision involved copying the initial data sets to the data cache 172, the data access metadata associated with the function 400 may be used to provide more efficient and lower-latency access to the initial data sets (e.g., at data cache 172). In some embodiments, although one of the initial data sets (OBJ_1) has been modified by function 400, the modified version may not be provided to function 402 by default. For example, the data sets may be immutable, and only the original unmodified initial data sets are provisioned to each function regardless of modifications may be other functions. However, because function 400 has invoked or otherwise provided function 402 with a data reference to the modified initial data set (MOD_OBJ_1), the on-demand code execution system 120 can provide function 402 with access to the modified initial data set. For example, the on-demand code execution system 120 can copy MOD_OBJ_1 from the local storage for function 400 to the local storage for function 402 based on the data reference. In this way, a degree of state persistence may be achieved and functions can be chained together to operate on and mutate data over the course of more operations or longer time than possible or practical with a single function of the on-demand code execution system 120.

Continuing with the example illustrated in FIG. 4, once the execution environment has been provisioned and function 402 has been invoked, the data access metadata 426 for function 402 reflects LOCAL_LOCATION_2 for MOD_OBJ_1 and CACHE_LOCATION_2 for OBJ_2. Subsequently, function 402 may initiate a local file system read operation for OBJ_2. OBJ_2 can be copied from data cache 172 to VM data store 158B based on data access metadata 426. The on-demand code execution system 120 can then modify data access metadata 426 to generate data access metadata 428, reflecting LOCAL_LOCATION_4 as the location of OBJ_2. Function 402 may then modify OBJ_2 to generate MOD_OBJ_2. Accordingly, MOD_OBJ_2 may be stored in local storage, and data access metadata 430 may be generated reflecting LOCAL_LOCATION_5 as the storage location for MOD_OBJ_2.

EXAMPLE EMBODIMENTS

Figure 5:
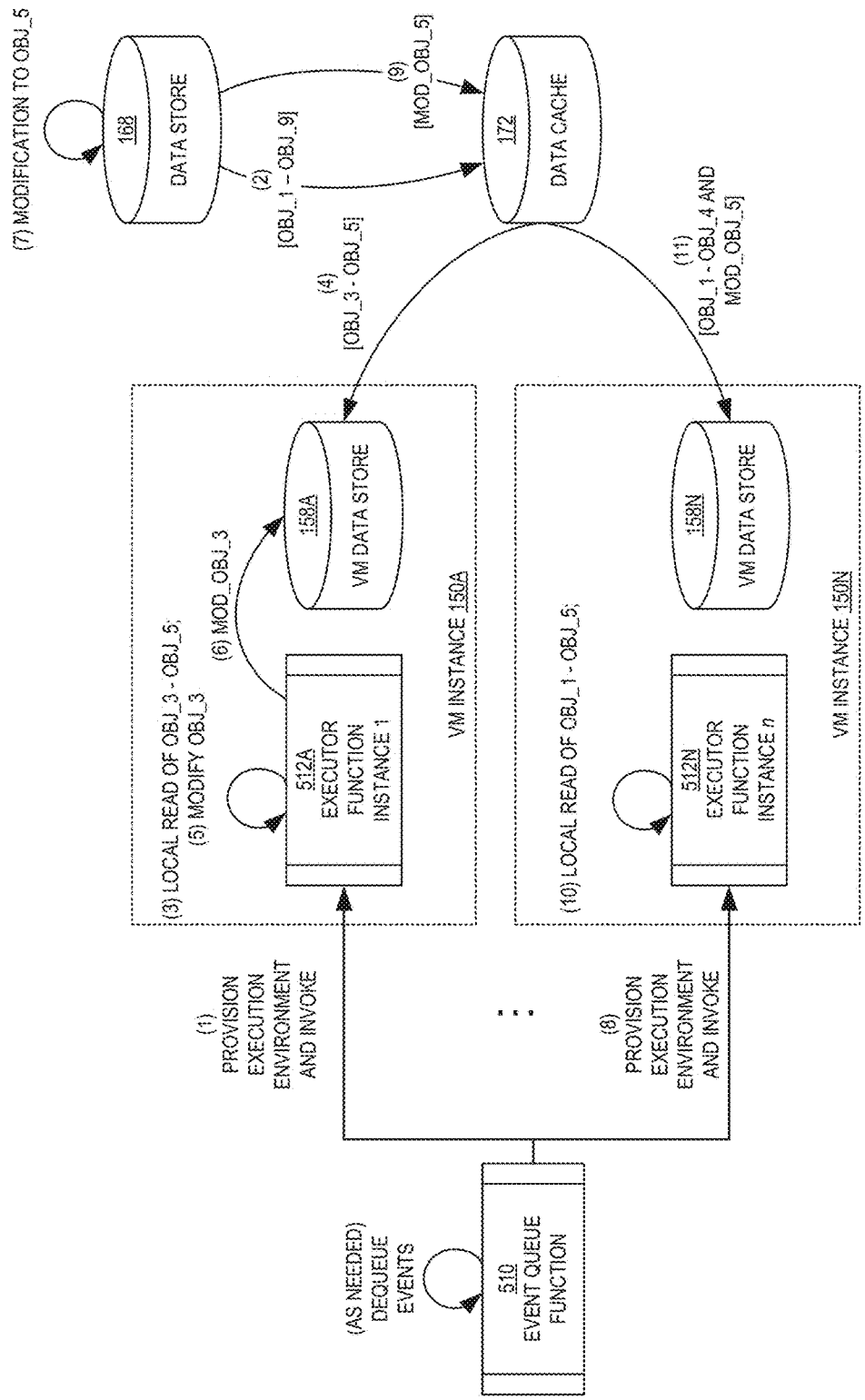
FIG. 5 is a block diagram of illustrative data flows and interactions during event-based invocation of on-demand code with sharing of data according to some embodiments.

FIG. 5 illustrates an example implementation in which on-demand functions are invoked and executed in response to occurrence of events, and each function operates on initial data sets that may in some cases be updated by external processes. This implementation may be used in applications such as data analytics and data processing in which large data sets are used to process events. In some cases, the data sets may be so large (e.g., many gigabytes, terabytes, or more) that computing resource constraints make obtaining the data sets in response to the events impractical or impossible. For example, there may be limitations on bandwidth usage or execution time that prevent obtaining some large data sets altogether. As another example, even if bandwidth and execution time are not systematically constrained, usage charges based on execution time can make obtaining the data sets in response to each event impractical. By specifying the data sets as initial data sets in configuration data, and by using the data provisioning methods and features described herein, the on-demand code execution system 120 can effectively make a large data set available for use by any number of functions.

The processing may begin with execution of an event queue function 510, which dequeues events and invokes executor functions to respond to or otherwise process the events. Invocation of the event queue function 510 or of a first executor function may trigger the data provisioning process. In some embodiments, configuration data may specify that the large data set is composed of a collection of subsets, which are made available to subsequent executor functions as initial data sets for use in processing or responding to events. For example, the on-demand code execution system 120 may copy the subsets from the network-accessible source data store 168 to the cache service 170, where the subsets will be available in one or more data caches 172 for use by executor functions. Once the on-demand code execution system 120 has obtained and made available the initial data sets, executor functions may use the subsets to respond to or otherwise processes events.

The event queue function 510 may maintain or have access to an event queue in which various events are queued for processing. For example, events may be transactions to be processed based on the large data set. The event queue function 510 may dequeue events from the event queue and invoke executor function instances 512. The executor function instances 512 may be invoked instances of the same function code, or they may be invoked instances of different function code. For example, the event queue function 510 may invoke an executor function instance 512 for each event dequeued from the event queue, such that n executor function instances 512 are invoked if there are n events in the queue. The event queue function 510 may invoke a given executor function instance 512 with a parameter identifying or detailing the event to be processed by the executor function instance 512. Executor function instances 512 may use the initial data sets to process or respond to events, as needed, without first being required to obtain the large data sets.

For example, as shown, executor function 512A may be invoked at (1), and objects OBJ_1 to OBJ_9 referenced by configuration data associated with the executor function 512A may be copied from source data store 168 to data cache 172 at (2). At (3), executor function 512A may initiate a local file system read of objects OBJ_3 to OBJ_5, and those objects may be copied from data cache 172 to local data storage VM data store 158A at (4). At (5), executor function 512A may modify OBJ_3, and cause storage of MOD_OBJ_3 at (6). Data access metadata may be modified accordingly, as described herein.

At (7), a modification to OBJ_5 may occur at data storage service 160 (e.g., at data store 168). Subsequently, executor function 512N may be invoked at (8). Objects OBJ_1 to OBJ_9 referenced by configuration data associated with the executor function 512N have already been copied from source data store 168 to data cache 172 at (2). However, because OBJ_5 has been modified as MOD_OBJ_5, that modified version may be copied to data cache 172 at (9). At (10), executor function 512A may initiate a local file system read of objects OBJ_1 to OBJ_5, and those objects— including MOD_OBJ_5 instead of OBJ_5—may be copied from data cache 172 to local data storage VM data store 158N at (11).

The example functions, data flows, and interactions shown in FIG. 5 and described herein are illustrative only, and are not intended to be limiting, required, or exhaustive. In some embodiments, additional, fewer, or alterative functions, data flows, or interactions may be implemented.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory. EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might." "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising." "including." "having." and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z." unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a data storage service comprising a first set of computing devices, wherein the data storage service stores a plurality of data objects;
a cache service comprising a second set of computing devices, wherein the cache service is configured to store cached versions of data objects; and
an on-demand code execution service comprising a third set of computing devices for on-demand execution of function code, wherein the on-demand code execution service is configured to:
 receive a first request to execute a first function, wherein the first function is defined by first function code;
 in response to the first request:
  provision a first computing device of the third set of computing devices with the first function code;
  determine, based at least partly on configuration data associated with the first function code, a data object stored in the data storage service to be made available to the first function;
  load the data object from the data storage service to the cache service;
  generate, based on loading the data object from the data storage service to the cache service, first data access metadata to be used to provide the first function access to the data object;
  execute the first function;
  determine, during execution of the first function, that the first function is requesting access to the data object;
  in response to determining that the first function is requesting access to the data object, load the data object, based on the first data access metadata, from the cache service to a local data store from where the first function is provided access the data object; and update the first data access metadata to generate second data access metadata reflecting loading of the data object from the cache service to the local data store;

receive a second request to execute a second function, wherein the second function is defined by second function code; and in response to the second request:

provision a second computing device of the third set of computing devices with the second function code;

determine, based at least partly on the configuration data, that the data object is to be made available to the second function;

use the second data access metadata, reflecting loading of the data object from the cache service, to make the data object available to a second function; and execute the second function.

2. The system of claim 1, wherein the data object is exposed to the first function via a local file system associated with the first function.

3. The system of claim 2, wherein the first request and second request are received from an executor function configured to invoke the first function and the second function in response to occurrence of one or more events.

4. The system of claim 1, wherein the on-demand code execution service is further configured to:

determine the first function is requesting to write a modified version of the data object;

store the modified version of the data object in a local data store associated with the first function; and modify the second data access metadata to generate third data access metadata to be used to access the modified version of the data object.

5. A computer-implemented method comprising:

under control of a computing system comprising one or more computer processors configured to execute specific instructions, configuring a code execution system to execute a first instance of first function code, wherein the code execution system provides on-demand execution of function code on dynamically-selected hardware;

determining, based at least partly on configuration data associated with the first function code, a data set stored in a source data store to be made available to the first instance;

loading the data set from the source data store to a data cache in network communication with the code execution system;

generating, based on loading the data set from the source data store to the data cache, first data access metadata to be used to provide the first instance access to the data set;

executing the first instance using the code execution system;

determining the first instance is requesting to access at least a portion of the data set;

in response to determining the first instance is requesting to access at least the portion of the data set, using the first data access metadata to load at least the portion of the data set from the data cache to a local data store that is locally accessible to the first instance within the code execution system;

updating the first data access metadata to generate second data access metadata reflecting loading of the portion of the data set from the data cache to the local data store; and using one of the first data access metadata or the second data access metadata to make the data set available to a second instance.

6. The computer-implemented method of claim 5, further comprising exposing the data set to the first instance via a local file system associated with the first instance.

7. The computer-implemented method of claim 5, further comprising, subsequent to generating the second data access metadata:

determining the first instance is again requesting to access the portion of the data set; and in response, providing the first instance with the portion of the data set from the local data store.

8. The computer-implemented method of claim 5, further comprising:

receiving an invocation request to execute the second instance as one of: another instance of the first function code, or an instance of second function code different from the first function code;

configuring the code execution system to execute the second instance;

executing the second instance using the code execution system; and determining the second instance is requesting to access at least the portion of the data set, wherein making the data set available to the second instance comprises loading, based at least partly on the second data access metadata, the portion of the data set to a second local data store that is locally accessible to the second instance within the code execution system.

9. The computer-implemented method of claim 5, further comprising:

determining the first instance is requesting to write a modified version of the portion of the data set, wherein the portion of the data set comprises a data object, and wherein the modified version of the portion of the data set comprises a modified data object;

in response, storing the modified data object in the local data store; and modifying the second data access metadata to generate third data access metadata to be used to access the modified data object responsive to requests to access the data object.

10. The computer-implemented method of claim 9, further comprising:

receiving an invocation request to execute the second instance as one of: another instance of the first function code, or an instance of second function code different from the first function code;

configuring the code execution system to execute the second instance, wherein making the data set available to the second instance comprises using the second data access metadata to load the modified data object from the local data store to a second data store locally accessible to the second instance within the code execution system;

generating third data access metadata to be used to provide the second instance access to the modified data object; and executing the second instance using the code execution system.

11. The computer-implemented method of claim 10, further comprising:

receiving, from the second instance, a request to access a second data object; and in response, using the third data access metadata to load the second data object from the data cache to the second data store.

12. The computer-implemented method of claim 5, wherein loading the data set to the data cache comprises loading a plurality of data objects from the source data store identified in the configuration data to the data cache in network communication with the code execution system.

13. The computer-implemented method of claim 5, wherein loading the data set to the data cache comprises loading a block storage volume from the source data store identified in the configuration data to the data cache in network communication with the code execution system.

14. The computer-implemented method of claim 5, further comprising:
   determining that the portion of the data set has been modified at the source data store as a modified portion of the data set; and
   loading the modified portion of the data set to the data cache in network communication with the code execution system.

15. A system comprising computer readable memory and one or more processors, wherein the system is configured to:
   configure a code execution system to execute a first instance of first function code, wherein the code execution system provides on-demand execution of function code on dynamically-selected hardware;
   determine, based at least partly on configuration data associated with the first function code, a data set stored in a source data store to be made available to the first instance;
   load the data set from the source data store to a data cache in network communication with the code execution system;
   generate, based on loading the data set from the source data store to the data cache, data access metadata to be used to access the data set;
   execute the first instance using the code execution system;
   determine the first instance is requesting to access at least a portion of the data set;
   in response to determining the first instance is requesting to access at least the portion of the data set, use the data access metadata to load at least the portion of the data set from the data cache to a local data store that is locally accessible to the first instance within the code execution system; and
   use the data access metadata to make the data set available to a second instance, wherein the second instance comprises one of: another instance of the first function code, or an instance of second function code different from the first function code.

16. The system of claim 15, wherein the data set is exposed to the first instance via a local file system associated with the first instance.

17. The system of claim 15, where the system is further configured to, subsequent to using the data access metadata to load the portion of the data set from the data cache to the local data store:
   generate second data access metadata representing the local data store as a storage location of the portion of the data set;
   determine the first instance is again requesting to access the portion of the data set; and
   in response, provide the first instance with the portion of the data set from the local data store.

18. The system of claim 15, where the system is further configured to:
   receive an invocation request to execute the second instance;
   configure the code execution system to execute the second instance;
   execute the second instance using the code execution system; and
   determine the second instance is requesting to access at least the portion of the data set, wherein to make the data available to the second instance using the data access metadata, the system is further configured to load, based at least partly on the data access metadata, the portion of the data set from the data cache to a second local data store that is locally accessible to the second instance within the code execution system.

19. The system of claim 15, where the system is further configured to:
   determine the first instance is requesting to write a modified version of the portion of the data set, wherein the portion of the data set comprises a data object, and wherein the modified version of the portion of the data set comprises a modified data object;
   in response, store the modified data object in the local data store; and
   modify the data access metadata to generate second data access metadata to be used to access the modified data object responsive to requests to access the data object.

20. The system of claim 19, where the system is further configured to:
   receive an invocation request to execute the second instance;
   configure the code execution system to execute the second instance;
   use the second data access metadata to load the modified data object from the local data store to a second data store locally accessible to the second instance within the code execution system;
   generate third data access metadata to be used to provide the second instance access to the modified data object;
   execute the second instance using the code execution system;
   receive, from the second instance, a request to access a second data object; and
   in response, use the third data access metadata to load the second data object from the data cache to the second data store.

* * * * *

UNITED STATES PATENT AND TRADEMARK OFFICE
CERTIFICATE OF CORRECTION

| | | |
|---|---|---|
| PATENT NO. | : 12,135,688 B1 | Page 1 of 1 |
| APPLICATION NO. | : 18/062972 | |
| DATED | : November 5, 2024 | |
| INVENTOR(S) | : Srinivas Jasti et al. | |

It is certified that error appears in the above-identified patent and that said Letters Patent is hereby corrected as shown below:

In the Drawings

On Sheet 3 of 5, Fig. 3, Ref No. 306, Line 1, delete "LOAD INIITAL DATA" and insert --LOAD INITIAL DATA--.

On Sheet 3 of 5, Fig. 3, Ref No. 314, Line 2, delete "ACCESS MEATADATA, INCLUDING" and insert --ACCESS METADATA, INCLUDING--.

In the Specification

In Column 6, Line 38, delete ""native execution."" and insert --""native execution,""--.

In Column 21, Line 30, delete "EPROM memory. EEPROM" and insert --EPROM memory, EEPROM--.

In Column 21, Line 43, delete ""could," "might." "may,"" and insert --"could," "might," "may,"--.

In Column 21, Lines 54-55, delete "terms "comprising." "including." "having." and" and insert --terms "comprising," "including," "having," and--.

In Column 21, Line 63, delete "Y, Z." unless" and insert --Y, Z," unless--.

Signed and Sealed this
Eleventh Day of February, 2025

Coke Morgan Stewart
*Acting Director of the United States Patent and Trademark Office*